United States Patent [19]
van Lieshout et al.

[11] Patent Number: 5,792,439
[45] Date of Patent: Aug. 11, 1998

[54] PROCESS FOR THE PREPARATION OF HYDROXYLAMMONIUM SALTS

[75] Inventors: Lambertus H.W.M. van Lieshout, Meerssen; Peter A.C. Schevelier, Maastricht; Leonardus Lefferts, Stein, all of Netherlands

[73] Assignee: DSM N.V., Heerlen, Netherlands

[21] Appl. No.: 746,365

[22] Filed: Nov. 8, 1996

[30] Foreign Application Priority Data

Nov. 10, 1995 [BE] Belgium ................... 9500936

[51] Int. Cl.$^6$ .................. C01B 21/20; C01B 21/093
[52] U.S. Cl. ........................... 423/387; 423/388
[58] Field of Search ........................... 423/387, 388

[56] References Cited

U.S. PATENT DOCUMENTS

| | | | |
|---|---|---|---|
| 3,767,758 | 10/1973 | Mars et al. | 423/387 |
| 3,996,165 | 12/1976 | El-Ghatta et al. | 423/387 |
| 4,111,842 | 9/1978 | Van Montfoort et al. | 423/387 |
| 4,832,938 | 5/1989 | Gooser et al. | |

FOREIGN PATENT DOCUMENTS

| | | | |
|---|---|---|---|
| 2 231 440 | 1/1973 | Germany. | |
| 2542421 | 4/1976 | Germany | 423/387 |
| 7902291 | 3/1979 | Netherlands. | |
| 1 387 725 | 3/1975 | United Kingdom. | |
| 1 515 190 | 6/1978 | United Kingdom. | |

OTHER PUBLICATIONS

Belgium search report dated Nov. 10, 1995.

Toshima et al., 'Polymer–protected Palladium–Platinum Bimetallic Clusters: Preparation, Catalytic Properties and Structural Consideration', J. Chem. Soc. Faraday Trans., vol. 89, No. 14 (12 Jul. 1993).

*Primary Examiner*—Wayne Langel
*Attorney, Agent, or Firm*—Pillsbury, Madison & Sutro LLP; Cushman, Darby & Cushman IP Group

[57] ABSTRACT

The invention relates to a process for the preparation of a hydroxylammonium salt through catalytic reduction of nitrate ions in an acid medium, in the presence of an activated catalyst, which catalyst comprises carrier particles with a plurality of metal particles containing palladium and platinum, the relative concentrations of the palladium and the platinum in each metal particle being substantially the same. In particular, the distribution of platinum concentrations among different metal particles has a standard deviation of less than 4% absolute.

20 Claims, No Drawings

PROCESS FOR THE PREPARATION OF HYDROXYLAMMONIUM SALTS

BACKGROUND OF THE INVENTION

1. Field of the Invention

The invention relates to a process for preparing hydroxylammonium salt through catalytic reduction of nitrate ions in an acidic medium and in the presence of an activated catalyst. The catalyst comprises carrier particles with metal particles containing palladium and platinum.

2. Description of the Related Art

An important application of hydroxylammonium salts is in the preparation of oximes from ketones or aldehydes, for instance, the preparation of cyclohexanone oxime from cyclohexanone. Cyclohexanone oxime can be rearranged into caprolactam, from which nylon is prepared. Consequently, the synthesis of hydroxylammonium salts is commonly coupled with other known processes, such as the preparation of cycloalkanone oxime. Hydroxylammonium salts are also used in the production of antioxidants, dyeing auxiliaries, and photographic chemicals.

In the synthesis of hydroxylammonium, nitrate ions or nitrogen oxides, for example, are converted into hydroxylammonium ions with the aid of hydrogen according to the following reaction:

$$2H^+ + NO_3^- + 3H_2 \rightarrow NH_3OH^+ + 2H_2O.$$

Oximes can be prepared by a cyclic process in a reaction medium buffered with an acid (e.g., phosphoric acid and/or sulphuric acid) and buffer salts derived from the acid (e.g., alkali salts and/or ammonium salts). The cyclic process involves two synthesis zones. In a hydroxylammonium salt synthesis zone, the nitrate ions or nitrogen oxides are converted with hydrogen to hydroxylamine. The hydroxylamine reacts with free buffer acid to form the corresponding hydroxylammonium salt, which is then transported to an oxime synthesis zone where the hydroxylammonium salt reacts with a ketone to form the corresponding oxime, with release of acid. After separation of the oxime from the reaction medium, the reaction medium is returned to the hydroxylammonium salt synthesis zone and fresh nitrate ions or nitrogen oxides are added to the reaction medium.

Catalysts for the preparation of hydroxylammonium salts are commercially available, for example, from Johnson Matthey and Degussa. However, the activity and selectivity of these catalysts can be improved. An improved catalyst would make the process of preparing hydroxylammonium salts more efficient.

SUMMARY OF THE INVENTION

An objective of this invention is to provide a process with better selectivity and/or activity for the production of hydroylammonium salts by using an improved catalyst. The improved catalyst is provided as metal particles, the metal particles comprising the noble-metals palladium and platinum, deposited on carrier particles; the concentrations of palladium and platinum are substantially the same among different metal particles. This is not the case with present commercial catalysts. The concentration of palladium is not necessarily substantially the same in each metal particle as the concentration of platinum; instead,"substantially the same" means the concentrations of the relevant noble metal has a narrow distribution among different metal particles.

Hydroxylammonium salt is prepared through catalytic reduction of nitrate ions in an acidic medium, in the presence of an activated catalyst. The catalyst is provided as a metal particle comprising palladium and platinum; the platinum concentration among different metal particles has a standard deviation of less than about 4% absolute, preferably less than about 3.5%, and more preferably less than about 3%. Standard deviation (% absolute) is calculated by dividing the standard deviation of platinum concentrations of different metal particles by the average platinum concentration. The platinum concentration in each metal particle is the same as the weight percentage in each metal particle. In addition, the palladium:platinum ratio in each metal particle may be between about 7:3 and about 9.9:0.1. Preferably, the size of the metal particle may be between about 0.5 nm and about 20 nm; more preferably, the size of the metal particle is between about 1 nm and about 15 nm. The particle size of the carrier may be between about 0.1 μm and about 50 μm, and the carrier material may consist essentially of active carbon or graphite. The metal particles may be deposited on the walls of the pores of the carrier particles.

The advantages of the improved catalyst include increased activity in the reduction of nitrate ions, even at modest pressures, and increased selectivity for hydroxylamine. The improved catalyst increases the efficiency of producing hydroxylammonium salts by increasing the yield of hydroxylamine relative to unwanted products (e.g., nitrous oxide, nitrogen monoxide) and/or by operating the process at lower pressures, thus, lowering operational costs.

DETAILED DESCRIPTION OF THE INVENTION

Nitrate ions in an acidic medium are reduced to hydroxylammonium salt in the presence of an activated catalyst. The catalyst is provided as metal particles, each particle containing the noble-metals palladium and platinum, deposited on carrier particles; the concentrations of the palladium and the platinum in each metal particle are substantially the same."Substantially the same" is defined as a standard deviation of the platinum concentrations of the palladium-platinum alloy particles of at most about 4% absolute. Preferably the standard deviation of the concentration thus defined is smaller than about 3.5%; more preferably, the standard deviation is smaller than about 3%. The absolute error in the palladium concentration is the same as the absolute error in the platinum concentration.

The weight ratio of the palladium and the platinum may lie between about 6:4 and 9.9:0.1. Preferably the weight ratio lies between about 7:3 and 9.5:0.5. The weight ratio of platinum between different metal particles is also substantially the same.

In principle, any material that is stable in the reaction medium can be used as the carrier, for example active carbon or graphite. Silica is another possible carrier material.

The average particle size of the carrier is usually smaller than 50 μm. "Average particle size" is understood to mean that 50 vol. % of the particles is larger than this diameter. However, a carrier with at least 90 vol. % of the total number of particles having a diameter of less than about 20 μm has also proved to be suitable. In view of the smallness of such carrier particles, removing the catalyst through filtration may prove difficult. Normal filtration may be achieved without adversely affecting the catalyst's activity by adding an amount of inert material, for example carrier material without metal particles, having a particle diameter that exceeds that of the carrier particles of the catalyst, for example about 20–100 μm. An amount of about 0.3–10 g of inert material per gram of catalyst material is suitable.

Usually the average carrier particle size exceeds about 0.1 μm. If a cross-flow filtration technique is used, such as described in U.S. Pat. No. 5,362,398, the carrier particle size preferably exceeds about 1 μm, in particular it exceeds about 5 μm. If a more conventional filtration technique is used, the carrier particle size preferably exceeds about 10 μm.

The catalyst must be activated; the catalyst may be activated by the presence of one or more catalyst activators. Catalyst selectivity for different hydroxylamines depends on the specific element used as an activator. The catalyst activator may be an element from the group comprising Cu, Ag, Au, Cd, Ga, In, Tl, Ge, Sn, Pb, As, Sb and Bi. Compounds containing the elements in question may also be used as catalyst activators, for example oxides, nitrates, phosphates, sulphates, halogenides, tartrates, oxalates, formiates and acetates. The elements or their compounds can be directly applied to the catalyst as described in U.S. Pat. No. 3,767,758 or they can be added to the reaction medium. A suitable result can be obtained for a catalyst with a surface area of between 5–10 $m^2/g$ catalyst if about 0.01–5 mg, preferably about 0.02 mg to about 4 mg, of catalyst activator is present per gram of catalyst. The larger/smaller the surface of the catalyst, the more/less activator is needed.

The $H_2$ pressure at which this reaction takes place is generally between about 1 bar and about 50 bar, preferably between about 5 bar and about 25 bar. The total pressure of the reaction may be controlled by mixing an inert gas with the hydrogen. The $H_2$ used may or may not be purified. Purification may be aided by the presence of, for example, active carbon to remove organic components, a palladium catalyst to remove oxygen and/or zinc oxide to remove sulphur, and ruthenium to promote the conversion of CO and $CO_2$. If helium is mixed with the $H_2$, the helium can be purified with active carbon. Other inert gases like argon, nitrogen or methane are also suitable for mixing with the hydrogen gas.

Hydroxylammonium salts can be prepared at a pH between about 1 and about 6, preferably between about 1 and about 4. The pH of the reaction may be maintained by addition of a strong mineral acid, such as hydrochloric, nitric, sulphuric, or phosphoric acid or salts thereof. Nitric acid is a preferred source of nitrate ions.

The temperature may vary between about 20° C. and about 90° C.; preferably a temperature of between about 30° C. and about 70° C. is used.

Suitable reactor designs are described in "Ullmann's Encyclopedia of Industrial Chemistry", vol. A5, VCH Wienheim, page 36 (1986).

This process for preparing hydroxylammonium has been disclosed in Belgian patent application 9500936, filed Nov. 10, 1995, the entire contents of which are hereby incorporated by reference and relied upon. Moreover, all journal articles, texts, and patents cited in this specification are incorporated by reference in their entirety.

The invention will be further elucidated with reference to the following examples, without being limited thereto.

EXAMPLES AND COMPARATIVE EXPERIMENTS

The examples and comparative experiments were carried out in a thermostatted pressure reactor made of chrome-nickel steel, having an internal diameter of 80 mm and a volume of about 300 ml, according to the following process: the reactor was fitted with four 8-mm-wide baffles and a 6-blade turbine stirrer with a cross-section of 40 mm and blades of 10×10 mm. The reactor was operated as a three-phase slurry reactor with a continuous throughput of the liquid and gas phases, while the solid, powdered catalyst was retained in the reactor with the aid of a Teflon$^R$ membrane filter in the liquid outlet. A liquid feed containing 3.2 mol/l nitric acid dissolved in an aqueous 3.3 mol/l phosphoric acid buffer plus 0.1 mol/l NaOH was fed to the reactor with the aid of a pump. The volume of the liquid phase in the reactor was kept at a constant value of 115 ml. Hydrogen was also fed to the reactor. The reactor pressure was kept at a constant level with the aid of a pressure regulator in the gas outlet; the off-gas was cooled before the pressure regulator, while the total off-gas flow rate was measured after the pressure regulator. The hydrogen partial pressure was varied at a constant total pressure by mixing with helium to achieve the partial pressures listed in the Examples and Comparative Experiments. The total pressure used below was 40 bar.

The reactor was operated at a constant pH of 1.8. To maintain this pH, the supply of $H^+$ via the feed was adjusted to the amount consumed in the reaction via a pH measurement in the liquid outlet and adjustment of the feed flow rate.

All the products were analyzed on-line. The concentrations of the $N_2$, NO and $N_2O$ gases in the off-gas were measured with the aid of a gas chromatograph. The concentrations of hydroxylamine and $NH_4^+$, in addition to the remaining $H^+$, were determined by an automatic titrator. The catalysts were fed into the reactor; the concentrations may be inferred in the following Tables from the activity expressed per gram noble metal. The aim was to ensure constant activity in the reactor, which means that more or less catalyst was used, depending on the catalyst's activity. Then the reactor was closed and inertised with the aid of helium. After the inertisation, a pressure of 40 bar $H_2$ gas was introduced to the partial pressure listed in the Examples and Comparative Experiments, and the reactor was filled with 115 ml of liquid having the composition of the product solution (i.e., hydroxylamine, phosphoric acid, nitrate, and nitric acid). Then the reaction was started by introducing feed via the pump. The temperature was 55° C. and the stirring rate was 1300 rpm (rotations per minute); the reaction was run for two weeks.

The catalyst was activated with the aid of Ge, as a solution of $GeO_2$ in water or dissolved in the feed, which was introduced in steps during the course of the experiment. The first dose was added within a few minutes (between 1 and 10 minutes) after the start in each reaction.

Activation of catalyst was as follows: a first dose of approx. 0.0625 ML (monolayer) of Ge, followed by the same amount after 24 hours, to a total of 0.125 ML; then 0.0625 ML of Ge every 48 hours, to a total of 0.31 or 0.375 ML. The amount of Ge added in the Examples and Comparative Experiments is given below.

"Monolayer" is defined as follows: a complete monolayer of Ge corresponds to the number of Pd and/or Pt atoms on the surface of the metal particles. This number can be determined with the aid of CO chemisorption, on the assumption that every atom of noble-metal on the surface adsorbs one CO molecule.

Activation was effected in steps because the amount of catalyst activator that should be added is not known beforehand. In determining how much catalyst activator should be added, the objective to achieve maximal catalyst selectivity. When selectivity is maximized, the activity of the catalyst is also high and the yield can be greater than 90%. Ge was added in steps to maximize catalyst selectivity. In the Tables, the activity and selectivity are measured at the Ge dose resulting in maximum selectivity for hydroxylamine. The amount of Ge added to activate a commercial catalyst was the same as the amount added to activate the catalyst of the invention.

Temperature, pH, hydrogen pressure, nitrate concentration, hydroxylamine concentration, and stirring rate can also affect activation of the catalyst.

The feed flow rate was between 0.9 and 5 ml/min, depending on the catalyst's activity, the hydroxylamine concentration each time being typically 0.9–1.0 mol/l. Feed flow rate is adjusted according to pH of the reaction: constant pH indicates a constant hydroxylamine concentration. The hydroxylamine concentration can be maintained at a constant level during the reaction by means of a constant pH.

The activity A, expressed in mmol of $NO_3^-/g_{met}$·hr, was calculated as the sum of the product yields according to equation (1):

$$A = Y\text{-hyam} + Y\text{—}NH_4^+ + Y\text{—}N_2 + Y\text{—}NO + Y\text{—}N_2O \quad (1)$$

where Y stands for yield, and hyam stands for hydroxylamine. The amount of metal in the catalyst in grams is $g_{met}$.

The yield of the products in the liquid phase was calculated on the basis of the standardized concentrations c in mol/l, the liquid flow rate $Q_{feed}$ in ml/min and the amount of noble-metal introduced with the catalyst, expressed in grams ($g_{met}$), according to (2):

$$Y(x) = c(x) * Q_{feed} * 60/g_{met} \quad (2)$$

where x may be hydroxylamine or $NH_4^+$. $Q_{feed}$ was calculated from the weighed decrease in the feed (in grams) with time and the density of the liquid (grams/ml) that was measured before use.

The yields of the products in the gas phase were calculated from the concentrations c in vol. % measured by the gas chromatograph, the off-gas flow rate $Q_{gas}$ in Stl/hr and the amount of noble-metal ($g_{met}$):

$$Y(y) = a*[c(y)/100]*Q_{gas}*1000/(24.04*g_{met}) \quad (3)$$

where y stands for $N_2$, NO or $N_2O$ and where
a=1 in the case of NO
a=2 in the case of $N_2$ and $N_2O$
The factor 24.04 is the molar gas volume in L at 1 atm., 20° C.

$Q_{gas}$ was calculated by summing the measured supplied feed gases and the calculated gaseous products formed, after subtraction of the calculated summed $H_2$ consumption for all products.

The selectivity S, expressed in %, of each catalyst was calculated with the aid of the previously determined yield Y and the activity A according to:

$$S(z) = 100*Y(z)/A \quad (4)$$

where z stands for one of the products hydroxylamine, $NH_4^+$, $N_2$, NO or $N_2O$.

Thus, the selectivities were compared based on converted $NO_3^-$ and were calculated on the basis of measurements of the above products.

The weight ratio of the palladium to the platinum in an individual metal particle was determined with the aid of transmission electron microscopy (TEM) and elemental determination by energy-dispersive X-ray analysis (EDX). The apparatus used was a VG HB-5 STEM[R] from Vacuum Generators, equipped with a Field Emission Gun (FEG) as described in the special issue of Electron Optics Bulletin (November 1993) published by Philips Electron Optics.

The catalyst was first embedded in polymethylmethacrylate (PMMA), from which 70-nm-thick sections were cut. Then five representative carrier particles were selected and five individual metal particles were measured per carrier particle: four metal particles at the edge of the carrier particle and one metal particle at the center of the carrier particle. The sections were then irradiated in a transmission electron microscope (TEM) with a stream of electrons. The acceleration voltage was 120 kV. This led to the generation of element-specific X-ray radiation by the metal particles, which was detected with the aid of a Tracor-ExplorerR EDX detector in 500 seconds. The Pd/Pt ratio was calculated from the measured amount of X-ray radiation on the basis of 100% standardization to the sum of the Pd+Pt concentrations. The EDX technique is described in "Scanning Electron Microscopy and X-Ray Microanalysis" (Ed. J. I. Goldstein et al.), Plenum, N.Y. (1992). The load is measured separately by means of neutron activation analysis (NAA). The concentration of each noble metal in the metal particles is shown as Pd and Pt loads for the carrier particle, in percent by weight.

Example I and Comparative Experiments A–C

In the first series of experiments, catalysts were tested at 40 bar $H_2$ pressure. The catalysts had a 80-20 Pd/Pt ratio. The catalyst with a standard deviation [Pt] in the Pd/Pt alloy of 2.5 showed both higher selectivity and higher activity, as is shown in Table 1. 0.31 ML Ge was added to the reactions.

TABLE I

| | Type | Pd load wt. % | Pt load wt. % | standard deviation [Pt] of the metal particle % abs. | maximum selectivity towards hyam % N | activity mol $NO_3^-$/ $g_{met}$·hr | yield |
|---|---|---|---|---|---|---|---|
| Example I | Exp. Cat. | 8.3 | 1.9 | 2.5 | 85.5 | 4.75 | 4.06 |
| Exp. A | EF10RIW Degussa | 7.5 | 1.9 | 11 | 81.5 | 2.85 | 2.32 |
| Exp. B | EF1055R/W Degussa | 8.0 | 1.9 | 7 | 83 | 3.25 | 2.70 |
| Exp. C | 10R464 Johnson Matthey | 8.1 | 2.0 | 5 | 83.5 | 2.4 | 2.00 |

Example II and Comparative Experiment D

In these two experiments, the catalysts previously used in Comparative Experiment C and Example I were used at a $H_2$ pressure of 12 bar. The use of a lower $H_2$ pressure caused a decrease in activity and selectivity. It was unexpectedly found that the selectivity of the catalyst according to the invention decreases much less. The results are shown in Table II. 0.375 ML Ge was added to the reactions.

Matthey were tested at 10 bar $H_2$. Selectivity was again much improved for the catalysts of the invention as compared with Experiment G, see the results shown in Table V. 0.25 ML Ge was added to the reactions.

TABLE II

|  | Type | Pd load wt. % | Pt load wt. % | standard deviation [Pt] of the metal particle % abs. | maximum selectivity towards hyam % N | activity mol $NO_3^-$/ $g_{met}$ · hr | yield |
| --- | --- | --- | --- | --- | --- | --- | --- |
| Example II | Exp. Cat. | 8.3 | 1.9 | 2.5 | 81 | 2.4 | 1.94 |
| Exp. D | 10R464 Johnson Matthey | 8.1 | 2.0 | 5 | 76 | 1.05 | 0.80 |

Examples III–V and Comparative Experiment E

Catalysts with a 90-10 Pd/Pt ratio supplied by Engelhard (custom synthesized for DSM) and a commercial catalyst with a 80-20 Pd/Pt ratio supplied by Johnson Matthey were tested at 10 bar $H_2$. A high selectivity was obtained at an acceptable activity for the catalysts of the invention as compared with Experiment E. The results are shown in Table III. 0.31 ML Ge was added to the reactions.

TABLE III

|  | Type | Pd load wt. % | Pt load wt. % | standard deviation [Pt] of the metal particle % abs. | maximum selectivity towards hyam % N | activity mol $NO_3^-$/ $g_{met}$ · hr | yield |
| --- | --- | --- | --- | --- | --- | --- | --- |
| Example III | Q086-31 | 9.3 | 0.85 | 2.4 | 81.0 | 1.7 | 1.38 |
| Example IV | Q086-44 | 9.2 | 1.05 | 2.3 | 84.5 | 1.15 | 0.97 |
| Example V | Q086-55 | 8.8 | 0.95 | 1.3 | 84 | 1.75 | 1.47 |
| Exp. E | 10R464 Johnson Matthey | 8.1 | 2.0 | 5 | 74.5 | 1.1 | 0.82 |

Examples VI–VII and Comparative Experiment F

Catalysts with a 90-10 Pd/Pt ratio supplied by Engelhard (custom synthesized for DSM) and a commercial catalyst with a 80-20 Pd/Pt ratio supplied by Johnson Matthey were tested at 10 bar $H_2$. The results given in Table IV show that selectivity was much improved for the catalysts of the invention as compared with Experiment F. 0.375 ML Ge was added to the reactions.

TABLE IV

|  | Type | Pd load wt. % | Pt load wt. % | standard deviation [Pt] of the metal particle % abs. | maximum selectivity towards hyam % N | activity mol $NO_3^-$/ $g_{met}$ · hr | yield |
| --- | --- | --- | --- | --- | --- | --- | --- |
| Example VI | Q086-46 | 9.0 | 0.98 | 2.5* | 81 | 0.6 | 0.49 |
| Example VII | Q086-44 | 9.2 | 1.05 | 2.3 | 83.3 | 0.85 | 0.71 |
| Exp. F | 10R464 Johnson Matthey | 8.1 | 2.0 | 5 | 76 | 1.05 | 0.80 |

*estimation

Examples VIII–XI and Comparative Experiment G

Catalysts with a 90-10 and a 80-20 Pd/Pt ratio supplied by Engelhard (custom synthesized for DSM), and a commercial catalyst with a 80-20 Pd/Pt ratio supplied by Johnson

TABLE V

|  | Type | Pd load wt. % | Pt load wt. % | standard deviation \|Pt\| of the metal particle % abs. | maximum selectivity towards hyam % N | activity mol $NO_3^-$/ $g_{met} \cdot hr$ | yield |
|---|---|---|---|---|---|---|---|
| Example VIII | Q085-55 | 8.8 | 0.95 | 1.3 | 79.1 | 1.96 | 1.55 |
| Exmaple IX | Q086-46 | 9.0 | 0.98 | 2.5* | 81.3 | 1.14 | 0.92 |
| Example X | Q086-44 | 9.2 | 1.05 | 2.3 | 81.4 | 1.2 | 0.98 |
| Example XI | 40748 Engelhard | 8.8 | 0.95 | 1.7 | 84.2 | 0.9 | 0.75 |
| Exp. G | 10R464 Johnson Matthey | 8.1 | 2.0 | 5 | 70.5 | 1.57 | 0.71 |

*estimation

Examples XII and Comparative Experiment H

Catalysts were tested at 5 bar $H_2$. Selectivity improvements for the catalysts of the invention as compared with Experiment H are shown in Table VI. 0.25 ML Ge was added to the reactions.

TABLE VI

|  | Type | Pd load wt. % | Pt load wt. % | standard deviation \|Pt\| of the metal particle % abs. | maximum selectivity towards hyam % N | activity mol $NO_3^-$/ $g_{met} \cdot hr$ | yield |
|---|---|---|---|---|---|---|---|
| Example XII | Q086-46 | 9.0 | 0.98 | 2.5* | 79 | 0.8 | 0.63 |
| Exp. H | 10R464 Johnson Matthey | 8.1 | 2.0 | 5 | 73 | 1.0 | 0.73 |

*estimation

While the present invention has been described in connection with what is presently considered to be practical and preferred embodiments, it is understood that this invention is not to be limited to the disclosed embodiments of a process for preparing hydroxylammonium salts, but on the contrary is intended to cover various modifications and equivalent arrangements included within the spirit and scope of the appended claims.

Thus, it is to be understood that variations in the present invention can be made without departing from the novel aspects of this invention as defined in the appended claims.

What we claim is:

1. A process for preparation of hydroxylammonium salts from nitrate ions which comprises the steps of:
   (a) obtaining an activated catalyst comprised of a plurality of metal particles on a carrier particle, wherein each metal particle comprises palladium and platinum, each metal particle has a palladium concentration and a platinum concentration, and the palladium concentration and the platinum concentration have standard deviations of less than 4% absolute;
   (b) combining the nitrate ions with the activated catalyst to form a reaction mixture; and
   (c) catalytically reducing the nitrate ions to prepare the hydroxylammonium salts, wherein the reaction medium is acidic.

2. The process according to claim 1, wherein the standard deviations are less than 3 5% absolute.

3. The process according to claim 2, wherein the standard deviations are less than 3% absolute.

4. The process according to claim 1, wherein a weight ratio of palladium:platinum in each metal particle is between 6:4 and 9.9:0.1.

5. The process according to claim 4, wherein the weight ratio is between 7:3 and 9.5:0.5.

6. The process according to claim 1, wherein the carrier particle consists essentially of active carbon or graphite.

7. The process according to claim 1, wherein the carrier particle has a diameter between 0.1 μm and 50 μm.

8. The process according to claim 1, wherein the activated catalyst is activated by at least one catalyst activator selected from the group consisting of Cu, Ag, Au, Cd, Ga, In, Tl, Ge, Sn, Pb, As, Sb, Bi, and compounds thereof.

9. The process according to claim 8, wherein the at least one catalyst activator is added to the reaction medium.

10. The process according to claim 1, wherein the pH during reduction is between 1 and 4.

11. The process according to claim 1, wherein the temperature during reduction is between 20° C. and 90° C.

12. The process according to claim 1, wherein said reduction is conducted using $H_2$ gas and the $H_2$ pressure during reduction is between one bar and 50 bar.

13. A process for preparation of hydroxylammonium salts from nitrate ions, comprising the steps of:
   (a) obtaining an activated catalyst comprised of a plurality of metal particles on a carrier particle, wherein each metal particle comprises palladium and platinum, each metal particle has a platinum concentration, and the platinum concentration has a standard deviation of less than 4% absolute;
   (b) combining the nitrate ions with the activated catalyst to form a reaction mixture; and
   (c) catalytically reducing the nitrate ions to prepare the hydoxylammonium salts, wherein the reaction mixture is acidic.

14. The process according to claim 13, wherein the standard deviation is less than 3% absolute.

15. The process according to claim 13, wherein a weight ratio of palladium:platinum in each metal particle is between 7:3 and 9.5:0.5.

16. The process according to claim 13, wherein the carrier particle consists essentially of active carbon or graphite.

17. The process according to claim 13, wherein the carrier particle has a diameter between 0.1 μm and 50 μm.

18. The process according to claim 13, wherein the activated catalyst is activated by at least one catalyst activator selected from the group consisting of Cu, Ag, Au, Cd, Ga, In, Tl, Ge, Sn, Pb, As, Sb, Bi, and compounds thereof.

19. The process according to claim 18, wherein the at least one catalyst activator is added to the reaction medium.

20. The process according to claim 13, wherein the pH during the reduction is between 1 and 4, the temperature is between 20° C. and 90° C., and said reduction is conducted using $H_2$ gas and the $H_2$ pressure is between 1 bar and 50 bar.

* * * * *